Oct. 3, 1944. D. R. ROCKWOOD ET AL 2,359,492
QUICK CONNECTING TURNBUCKLE
Filed March 12, 1943
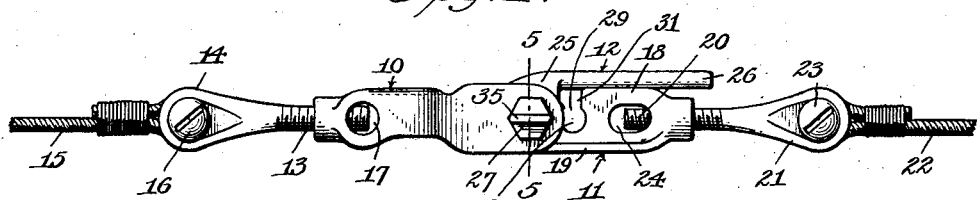
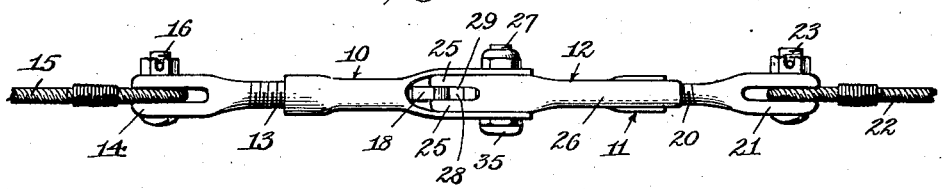
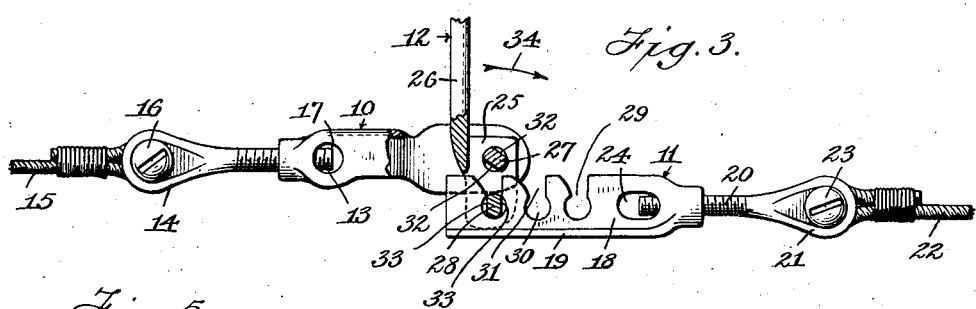
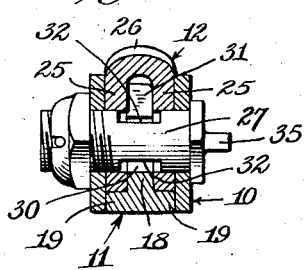
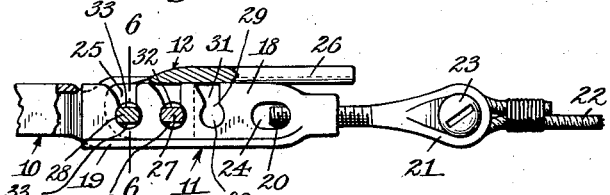
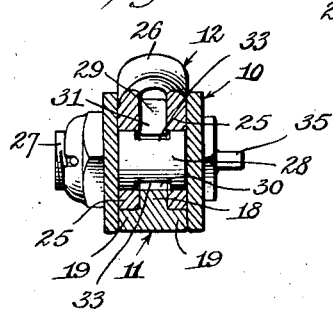
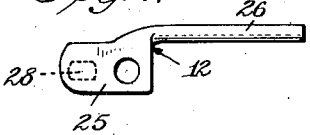
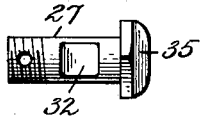
Donald R. Rockwood
George F. Deibel, Jr.
Inventors,
By
Attorney.

Patented Oct. 3, 1944

2,359,492

UNITED STATES PATENT OFFICE 2,359,492

QUICK CONNECTING TURNBUCKLE

Donald R. Rockwood, Williamsville, N. Y., and George F. Deibel, Jr., Chicago, Ill.

Application March 12, 1943, Serial No. 478,976

7 Claims. (Cl. 287—60)

Our invention relates to a connector for quickly connecting or detaching ropes, cables, chains or similar elements together or for connecting opposite ends of any of such elements, and it relates more particularly to a quick-acting turnbuckle serving such purposes.

While this invention is capable of use in all places where a connector or a turnbuckle is of use, it is particularly designed for use in airplanes; it having for one of its objects to provide a connector which will take any varying or intermittent loads ranging from complete slackness to high tension, regardless of whether such loads vary over long periods or occur in rapid sequence, without possibility of accidentally unlocking or becoming disconnected and without changing its initial position.

Another object of our invention is to enable the rigging of control cables in airplanes to be speeded up, due to the fact that the toggle arrangement embodied in the construction of our invention permits a rapid rough adjustment to be made, followed by a comparatively quick and exact finer adjustment, such as is necessary for accurate rigging on high-speed aircraft.

A further object of our invention is to provide a connector in the form of a quick-acting turnbuckle whereby a visual check of the position of the turnbuckle-yokes may be had and thus assurance furnished that the correct grip tolerance is being maintained on the cables, chains, or other elements, or the ends of such an element connected thereby; also to make it possible to hold to close rigging tolerances.

A still further object of our invention is to provide a connection of the kind mentioned whereby, due to the amount of take-up in the connection and the quick-acting connection and disconnection principle under which it operates, disassembly of an entire airplane for shipping, repairs, or otherwise is possible without disturbing the correct rigging of any connecting cables employed, since it is possible, upon the reassembly of the airplane parts or sub-assemblies comprising the plane, to connect the parts constituting our improved turnbuckle connection with the adjustment maintained in the same position they had when dis-assembly of the airplane was effected.

A still further object of our invention is to employ a novel method of locking connectors of this general type in closed position and to provide locking means not dependable on tension or load for locking efficiency.

With the above and other objects in view to appear hereinafter, our invention consists in the novel method and features of construction, and in the arrangement and combination of parts to be hereinafter described and more particularly pointed out in the subjoined claims.

In the drawing:

Fig. 1 is a side elevation of our improved connector, showing the ends of two cables or opposite ends of a single cable connected thereby and placed under tension.

Fig. 2 is a top plan view of the connector.

Fig. 3 is a side sectional elevation showing the separable parts of our improved connector in the position they initially assume when connecting the parts together.

Fig. 4 is a similar view showing one end of the connector broken away and the position of the parts when in locked positions.

Fig. 5 is an enlarged cross section taken on line 5—5, Fig. 1.

Fig. 6 is an enlarged cross section taken on line 6—6, Fig. 4.

Fig. 7 is a detached side elevation of the lock-lever forming part of our improved connector.

Fig. 8 is a side elevation of the combined pivot and lock-pin.

The reference numerals 10 and 11 designate the two main parts of what may be termed the turnbuckle-body and 12 is the lock-lever pivotally connected to part 10 by means of a combined pivot and lock-pin to be presently described.

Part 10 of the turnbuckle body is channel-shaped in cross section through a portion of its length and at its inner end it is forked to receive the lock-lever 12. The outer end thereof has the threaded stem 13 of a turnbuckle yoke 14 threaded thereinto and in the forked outer end of this yoke a cable, chain, or other element 15 adapted to be placed under tension is secured in the manner usually provided for in ordinary turnbuckles; this element being held in place by a securing-bolt 16. Near the outer end of the part 10, or turnbuckle member as it may be termed, a transverse sight opening 17 is formed, through which the inner end of the threaded stem of the turnbuckle yoke 14 is visible; the number of threads exposed at the inner end of the stem of this yoke affording a visual check of the extent of adjustment of the yoke into its receiving member 10.

The other part 11 of the turnbuckle body, which may also be termed a turnbuckle member, is of inverted T-formation in cross section, thus providing a comparatively wide web 18 and opposite outstanding flanges 19. The greatest width of the part or member 11 is therefore at its lower edge and the lower portion of this member fits freely within the forked inner end of the turnbuckle member 10, as clearly shown in Figs. 5 and 6. The outer end of member 11 has the threaded stem 20 of a turnbuckle yoke 21 adjustably arranged therein, and like the turnbuckle yoke 14 its outer end is forked and receives therein the looped end of a wire, cable, or the like 22, which is secured therein by means of a securing bolt 23. The parts of the cables shown may be individual cables or they may be opposite ends of a single cable, depending on the purpose for which the invention is to be used. Like the turnbuckle member 10, this member 11 also has a transverse sight opening 24 formed therein near its outer end into which the inner end of the threaded stem of the turnbuckle yoke 21 may be seen. The number of threads on said stem exposed in said sight opening will provide a visible check for adjustment of the turnbuckle yoke 21 within the turnbuckle member 11.

The lock-lever 12 is forked at its inner end and thus comprises two spaced-apart flat members 25 and a handle 26 extending from said flat members and at its inner end connecting them together. The outer surfaces of these flat members lie in contact with the inner surfaces of the two spaced-apart parts of the forked portion at the inner end of the turnbuckle member 10 and they are spaced-apart a distance conforming to the thickness of the web 18 forming part of the turnbuckle member 11, which web snugly fits into the forked portion of the lock-lever so formed.

As clearly shown in Fig. 5, a combined pivot and lock-pin 27 pivotally connects the lock-lever 12 with the forked inner end of the turnbuckle member 10 so that the lock-lever may be conveniently swung from its unlocked position, shown in Fig. 3, to its locking position, shown in Figs. 1 and 4. The forked end of the lock-lever therefore fits freely within the forked inner end of the turnbuckle member 10 and is designed to straddle the web 18 of the turnbuckle 11. The flat members 25 at opposite sides of the forked portion of the lock-lever are extended a distance beyond the combined pivot and lock-pin 27 and passed transversely through them is a retainer pin or stud 28, the ends of which are immovably secured within the flat members 25 of said lock-lever. It is, of course, understood that the lock-lever may be machined from an integral part, in which case the fastening of the retainer pin or stud in the side members of said lock-lever will not be required; or such pin or stud may be otherwise fixedly secured to said side members.

The web 18 of the turnbuckle member 11 is provided with what may be termed lock-notches 29 which open to the edge of said web and are of somewhat key-hole formation. More specifically stated they are circular at their inner ends, as at 30, and have entrance portions 31 extending from said circular inner ends to said edge. Said entrance portions 31 are restricted inwardly so that they are narrower at their inner ends than the diameter of the circular inner ends 30. One wall of each entrance portion is disposed at a right-angle to the length of the web 18, or substantially so, and its other wall is curved in an arc of a circle having the center of the circular inner end of an adjacent notch as its center, or substantially so. Any number of these notches may be used, depending on the length of the turnbuckle member 11 and the extent of adjustment desired, and the circular inner ends of these notches are spaced-apart, center to center, the same distance as the combined pivot and lock-pin 27 is spaced from the retainer pin or stud 28.

The combined pivot and lock-pin 27 is flattened at opposite sides, as at 32, so that along one dimension diametrically it is thinner than the restricted inner ends of the entrance portions 31 of the several lock notches 29. The retainer pin 28 is similarly flattened at opposite sides, as at 33, and both the pin 27 and the pin or stud 28 are adapted to be entered in any of the circular inner ends of said lock notches by passing the narrow regions of said pins through the entrance portions 31 of said notches.

In the act of connecting the two members 10 and 11 of the turnbuckle together, the lock-lever 12 will be disposed at a right angle to the turnbuckle member 10 in which it is pivotally secured; this being the unlocked position of said lever. Swinging movement of the lock-lever is permitted by reason of the flat members 25 thereof rotating on the combined pivot and lock-pin 27. When the lock-lever is so positioned, the flat sides of the retainer pin or stud 28 are parallel with one of the edges or sides of the entrance portion of each of the notches in the web of the turnbuckle member 11 and said pin or stud can then be entered into any desired lock notch and when entered will assume the position in the circular inner end of the selected lock-notch shown in Fig. 3. With the parts thus arranged the lock-lever 12 is then swung in the direction of the arrow 34, Fig. 3. This causes said lever to swing in an arc of a circle having the retainer pin or stud 28 as its center, thereby rotating said retainer pin and pulling the turnbuckle member 10 to the right, as shown in Fig. 3, and inwardly over the web 18 of the turnbuckle member 11. During this action the retainer pin or stud 28 will have been rotated through 90 degrees to bring the flattened sides at a right angle to the entrance portion of the lock-notch in which it has been entered and this will cause said pin or stud to be locked in the lock-notch. Preparatory to or while swinging the lock-lever from its unlocked to its locking position, the combined pivot and lock-pin 27 is positioned as shown in Fig. 3 so that, during the movement of said lock-lever and the connected turnbuckle member 10, said pivot and lock-pin will enter the next distant lock-notch 29 in the series formed in said web 18. When the combined pivot and lock-pin 27 reaches the circular inner end of said last-mentioned notch, the lock-lever 12 and the retainer pin 28 will have assumed the positions shown in Fig. 4; the flat sides of said retainer pin being then at a right angle to the entrance portion of the notch in which it is located, thus preventing withdrawal of said retainer pin. The combined pivot and lock-pin 27 is then rotated to similarly position the flattened portion thereof within its coacting notch and thus movement of the lock-lever will be prevented and accidental separation of the turnbuckle members prevented. It will therefore be apparent that the various parts of the connector will have assumed the position shown in Fig. 4 and it will be necessary to manually rotate the combined pivot and lock-pin 27 to position the narrowed portion thereof in line with the entrance portion of its retaining notch before the lock-lever 12 can be swung into open or unlocked position and when thus swung the retainer pin 28 will automatically move from the position shown in Fig. 4 to the position shown in Fig. 3, thus alining the flat sides of the narrow portion of said pin to permit withdrawal of the latter from its retaining notch.

Manifestly, in connecting the members of the turnbuckle together, the parts are so positioned that the lock-lever will be at an angle to both turnbuckle members, thereby positioning the retainer pin 28 so that it may be passed into the desired notch in the turnbuckle member 11. It is then merely necessary to swing the lock-lever parallel with said turnbuckle member, which is permitted by reason of the retainer pin 28 serving as the pivot for such swinging movement. This, therefore, will permit the ready insertion of the combined pivot or lock-pin into a second notch of the series formed in the turnbuckle member 11 and for providing the necessary clearance to enable said combined pivot and lock-pin to enter said last-mentioned notch. The entrance portion has its wall closest to the retainer pin 28 beveled, preferably curved in an arc of a circle having the axis of the retainer pin as its center, as hereinbefore stated. It is, of course, necessary to rotate the combined pivot and lock-pin 27 so that the narrow portion thereof, formed by flattening the sides, will enter the entrance portion of the notch and when the lock-lever will have been swung from the position shown in Fig. 3 to that shown in Fig. 4 said pivot and lock-pin will have entered the circular inner end of said notch and rotation of said pivot and lock-pin will position the narrow portion thereof at a right angle to said entrance portion and thus lock the two turnbuckle members together at two separate points. For convenience in rotating the combined pivot and lock-pin the head thereof is provided with an outstanding flange 35 which can easily be taken hold of. In this manner a quick or rough adjustment of the parts is effected, and if closer adjustment is required it is simply necessary to grasp the entire turnbuckle, which will act as though integral, and thread the threaded stems of the turnbuckle yokes the desired distances into the turnbuckle body; said stems being right and left-hand threads, respectively. The double locking of the two turnbuckle members together will guard against accidental disconnection of the parts and take care of any varying or intermittent load ranging from complete slackness to high tension, regardless of how the load strains are applied to the connector.

The quick acting toggle arrangement provided enables a quick rough approximate adjustment to be made and thus speed up the rigging of control cables in airplanes, and in most instances only slight exact adjustment may then be necessary for accurate rigging on high speed aircraft.

The sight openings formed in the turnbuckle members, which may more particularly be termed safety openings, assure definite thread grip of the turnbuckle and at the same time allow for a visual check of the position of the threaded yoke stems. It will be clear, therefore, that if any threads are visible in these sight or safety openings, assurance will be had that the correct grip tolerance is being held. Due to the sight openings being limited in length, the holding of close rigging tolerances is made possible. Therefore, at any time the ends of the threaded yoke stems approach the inner ends of the sight or safety openings and the further tightening of the turnbuckle would consequently be limited, the members of the turnbuckle can be easily and quickly separated by manipulation of the lock-lever 12. The turnbuckle yokes may then be unthreaded slightly so that the free ends of the stems of said turnbuckle terminate closer to the outer ends of said sight or safety openings, thus lengthening the spaces between the free ends of said stems and the inner ends of the sight or safety openings and allowing for a much greater tightening turnbuckle action by entering the pins or studs 28 and 27 in lock notches more distant from the free end of the turnbuckle member 11. This is of decided advantage in new airplanes where re-adjustment of cables is found necessary after what is termed a "shake down" or test flight. This would also be of extreme advantage in the assembling of component sections, or in other words, in the connecting of sub-assemblies, where cables must be joined to form a complete tension system. Preferably the sight or safety openings are of a length that their combined effective lengths equal the distance between adjacent locknotches in the member 11 of the turnbuckle assembly.

Our improved connector is also of decided advantage when disassembling airplanes for shipping, repairs, etc., since it is possible to disassemble sections or parts of the airplane by disconnecting the members 10 and 11 of the turnbuckle body while leaving the correct rigging of connected cables undisturbed. Assuming for example, that an airplane having control cables extending into its wings was completely rigged and had to be torn down for shipping, it would simply be necessary to rotate the pivot or lockpin 27 from its position in which the flat sides thereof are parallel with the lock-lever, as shown in Fig. 4, to the position in the lock-lever shown in Fig. 3. This would then permit the locklever to swinging from the position shown in Fig. 4 to that shown in Fig. 3, causing the retainer pin 28 to rotate within its retaining notch and assume the position shown in Fig. 3. The narrowed portion of said retainer pin would be parallel with the entrance portion of its receiving notch and thus permit withdrawal therefrom. Separation of the turnbuckle members could then occur without in any manner disarranging other existing adjustments.

When arriving at their destination, the disassembled parts may again be assembled and it would simply be necessary to insert the retainer pin 28 in the slot from which it was disconnected, swing the lock-lever 12 from the position shown in Fig. 3 to that shown in Fig. 4 and to manually rotate the lock-pin 27 to position the latter that its narrowed portion will be at a right angle to the entrance portion of its receiving notch, thus preventing both pins from being withdrawn from their respective notches, as clearly shown in Fig. 4. This will bring all parts and adjustments back to the positions which they had when the airplane was first disassembled for shipment. This is possible because no parts provided for fine adjustment will have been altered, and therefore when the turnbuckle members are connected by the means provided for quickly and roughly connecting the same, all parts of the connector will have been brought back to the same positions and under the same tensions that they had before disassembly of the airplane occurred. It is, of course, understood that any minor error due to change in temperature, climate, or otherwise can be quickly and accurately corrected by the adjustment available under rotation of the turnbuckle body.

We wish to particularly stress the fact that the flat-sided pin for locking the turnbuckle members together is a decided improvement over any method now employed, since tension or load is not depended upon for assuring locking qualities and any loads or strains applied to the connector will in no manner tend to cause unlocking of parts thus connected.

By providing a notch with a circular inner portion adapted to receive a pin corresponding in diameter along one dimension to that of said inner portion and having a narrowed or restricted entrance portion leading thereto and the flattening of the pin at opposite sides, will enable the ready insertion of the pin into said notch when positioned with its flat sides parallel with the walls of said entrance portion and upon rotating said pin within the circular inner portion of the notch to bring the flat sides of the pin at a right angle to the entrance portion, the pin will be locked and withdrawal of the same from the notch will be prevented. Withdrawal of the pin from its notch, however, can be easily effected by rotating the pin as stated, regardless of the tension or load applied to the turnbuckle.

Having thus described our invention what we claim is:

1. A connector in the form of a turnbuckle having separable members, means for adjustably connecting said members together so that the connector may be varied in length and said members rotated in unison and so that said members may be disconnected one from the other, each of said members having a sight opening near its outer end, and turnbuckle yokes having threaded stems entered in the outer ends of said turnbuckle members and adapted to extend into said sight openings, said sight openings enabling the definite thread grip of said turnbuckle yokes in said turnbuckle members to be determined by the length of the spaces between the inner ends of said threaded stems and the inner ends of said sight openings.

2. A connector for connecting cables or parts of a cable or other tension elements together, comprising two turnbuckle members detachably connected to vary the combined length of the same under quick acting connecting means placing said tension elements under strain by the mere act of connecting said members together, and means at opposite ends for attachment to the said tension elements and for adjustable attachment to said turnbuckle members to effect a fine adjustment and thus apply the exact tension, if any, required for such tension elements after placing the latter under strain by the mere connection of said turnbuckle members one with the other.

3. A turnbuckle, comprising two members, and means for detachably connecting said members together including a pair of spaced-apart pins carried by one member and a plurality of notches formed in the other in similarly spaced relation to receive said pins, said pins being rotative and locking said members together when in one rotative position and upon rotation from their locking positions enabling the pins to be withdrawn from their receiving notches to permit separation of said members, one of said pins being entered in one of said notches to serve as a pivot on which the member carrying said pin may swing and the other serving to lock said members together after being rotated.

4. A turnbuckle, comprising two members, and means for detachably connecting said members together including a pin and notch connection, said pin being reduced in diameter in one direction, and said notch having a circular inner portion corresponding to the diameter of said pin in an opposite direction, said notch including a restricted entrance portion permitting the reduced portion of said pin to be passed therethrough and enter said circular inner portion, said pin being rotatable within said circular inner portion to prevent dislodgment thereof from said notch.

5. A connector, comprising two turnbuckle members, one of which has a longitudinal series of notches enlarged at their inner ends, a lock-lever pivotally connected to the other of said turnbuckle members, a retainer pin carried by said lock-lever and adapted to enter any of said series of notches, said retainer pin serving as a center for swinging said lock-lever and being formed to enter any selected notch of said series when said lock-lever is in its unlocked position and to lock into said notch when said lock-lever is in locking position, and a combined pivot and lock-pin rotatable in said other turnbuckle member and on which said lock-lever swings, said combined pivot and lock-pin being rotatably adjustable and formed to enter another of said series of notches when swinging said lock-lever into locking position, said combined pivot and lock-pin being adapted to be rotatably adjusted to lock the same into said last-mentioned notch.

6. A connector, comprising two turnbuckle members, one of which has a longitudinal series of notches, each of which latter is circular at its inner end and has a restricted entrance portion leading to said circular portion, a lock-lever pivotally connected to the other of said turnbuckle members and adapted to swing through an arc of a circle, a retainer pin carried by said lock-lever and flattened at opposite sides in the plane of said series of notches and positioned to enable it to be passed through the entrance portion of any selected one of said series of notches when said lock-lever is in one position in its range of movement, said retainer pin being adapted to be rotated within the circular inner end of said notch when said lock-lever is swung to another position in its range of movement, and a pivot pin rotatable in said second-mentioned turnbuckle member and in said lock-lever and on which said lock-lever is fulcrumed, said pivot pin being flattened on opposite sides to permit of entering a second notch in said series when swinging said lock-lever into locking position, said pivot pin being separately rotatable to position the flat sides thereof in line with or at a right angle to the entrance portion of the notch in which it is entered.

7. A connector, comprising two turnbuckle members, one of which has a longitudinal series of notches, each of which latter is circular at its inner end and has an entrance portion gradually restricted inwardly toward its circular inner end, one wall of each of said restricted entrance portions being curved in an arc of a circle having the axis of the circular inner end of an adjacent notch as its center, a lock-lever pivotally connected to the other of said turnbuckle members and adapted to swing through an arc of a circle towards and away from said first-mentioned member, a retainer pin carried by said lock-lever and reduced in diameter in one dimension in the plane of said series of notches, said retainer pin being adapted to travel along the curved wall and pass through the entrance portion of any selected one of said series of notches when said lever is at the end of its movement in one direction and to be rotated within the circular inner end of said notch when said lock-lever is being swung to the end of its movement in the opposite direction, and a pivot pin rotatable in said second-mentioned turnbuckle member and in said lock-lever and on which said lock-lever is fulcrumed, said pivot pin being reduced in diameter in one dimension in the plane of said series of notches and adapted to travel along the curved wall and pass through the entrance portion of an adjacent notch in said series of notches when swinging said lock-lever into its last-mentioned position, said pivot pin being separately rotatable to position the portion thereof reduced in diameter in line with or at a right-angle to the entrance portion of the notch in which it is entered.

DONALD R. ROCKWOOD.
GEORGE F. DEIBEL, Jr.